United States Patent
Homma et al.

(10) Patent No.: US 11,536,077 B2
(45) Date of Patent: Dec. 27, 2022

(54) OPEN-CLOSE BODY CONTROLLER

(71) Applicant: DENSO CORPORATION, Kariya (JP)

(72) Inventors: Hiroaki Homma, Kariya (JP);
Kentarou Hara, Kariya (JP)

(73) Assignee: DENSO CORPORATION, Kariya (JP)

( * ) Notice: Subject to any disclaimer, the term of this patent is extended or adjusted under 35 U.S.C. 154(b) by 411 days.

(21) Appl. No.: 16/751,910

(22) Filed: Jan. 24, 2020

(65) Prior Publication Data
US 2020/0284085 A1 Sep. 10, 2020

(30) Foreign Application Priority Data
Jan. 30, 2019 (JP) .............................. JP2019-014332

(51) Int. Cl.
*E05F 15/71* (2015.01)
*B60J 5/04* (2006.01)

(52) U.S. Cl.
CPC ............. *E05F 15/71* (2015.01); *B60J 5/0402* (2013.01); *E05Y 2900/55* (2013.01)

(58) Field of Classification Search
CPC ....... E05F 15/71; E05F 15/695; E05F 15/689; B60J 5/0402; E05Y 2900/55
See application file for complete search history.

(56) References Cited

U.S. PATENT DOCUMENTS

2020/0102780 A1* 4/2020 Song .................... E05F 15/695

FOREIGN PATENT DOCUMENTS

| CN | 207892422 U | * | 9/2018 |
| CN | 209471548 U | * | 10/2019 |
| JP | 2003-336446 A | | 11/2003 |
| JP | 2005-220648 A | | 8/2005 |
| JP | 2008-285885 A | | 11/2008 |
| JP | 2008291590 A | * | 12/2008 |
| JP | 2016-172996 A | | 9/2016 |
| KR | 10-2012-0083117 A | | 7/2012 |

* cited by examiner

*Primary Examiner* — An T Nguyen
(74) *Attorney, Agent, or Firm* — Oliff PLC

(57) ABSTRACT

An open-close body controller includes a control unit that controls a motor unit to open and close an open-close body arranged on a vehicle door between a fully closed position and a fully open position. The control unit executes a normal temperature voltage control that adjusts a speed of the open-close body by controlling a voltage supplied to the motor unit during a closing action when an outside temperature is a normal temperature and supplies the motor unit with a higher voltage than that in the normal temperature voltage control when the outside temperature is deviated from the normal temperature.

3 Claims, 2 Drawing Sheets

OPEN-CLOSE BODY CONTROLLER

BACKGROUND

1. Field

The following description relates to an open-close body controller.

2. Description of Related Art

Known examples of an open-close body controller arranged in a vehicle include, for example, a power window device, a sliding door device, a sunroof device, and the like (for example, refer to Japanese Laid-Open Patent Publication No. 2016-172996). Such a known open-close body controller includes a motor unit that moves an open-close body. The open-close body controls the voltage supplied to the motor unit to adjust a moving speed of the open-close body.

Patent Document 1 describes an open-close body controller configured to execute voltage control (speed control), for example, when there is no rain or snow, and configured to not execute the voltage control in rain or snow.

The open-close body controller uses weather information to determine whether to execute the voltage control. However, the open-close body controller is used in an environment that is greatly affected by the outside temperature. The effect of the outside temperature may cause insufficient sliding or result in a situation in which the motor unit overheats. This may decrease the full-closing performance of the open-close body controller.

SUMMARY

It is an objective of the present disclosure to provide an open-close body controller that limits decreases in the full-closing performance that would otherwise be caused by the outside temperature.

In one general aspect, an open-close body controller (11) includes a control unit (14) that controls a motor unit (12) to open and close an open-close body (WG) arranged on a vehicle door (DR) between a fully closed position and a fully open position. The control unit executes a normal temperature voltage control that adjusts a speed of the open-close body by controlling a voltage supplied to the motor unit during a closing action when an outside temperature is a normal temperature and supplies the motor unit with a higher voltage than that in the normal temperature voltage control when the outside temperature is deviated from the normal temperature.

With the above embodiment, when the outside temperature is deviated from a normal temperature, the voltage supplied to the motor unit is higher than that in the normal temperature voltage control. This limits decreases in the full-closing performance under a low or high temperature.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of an open-close body controller will now be described.

Figure 1:
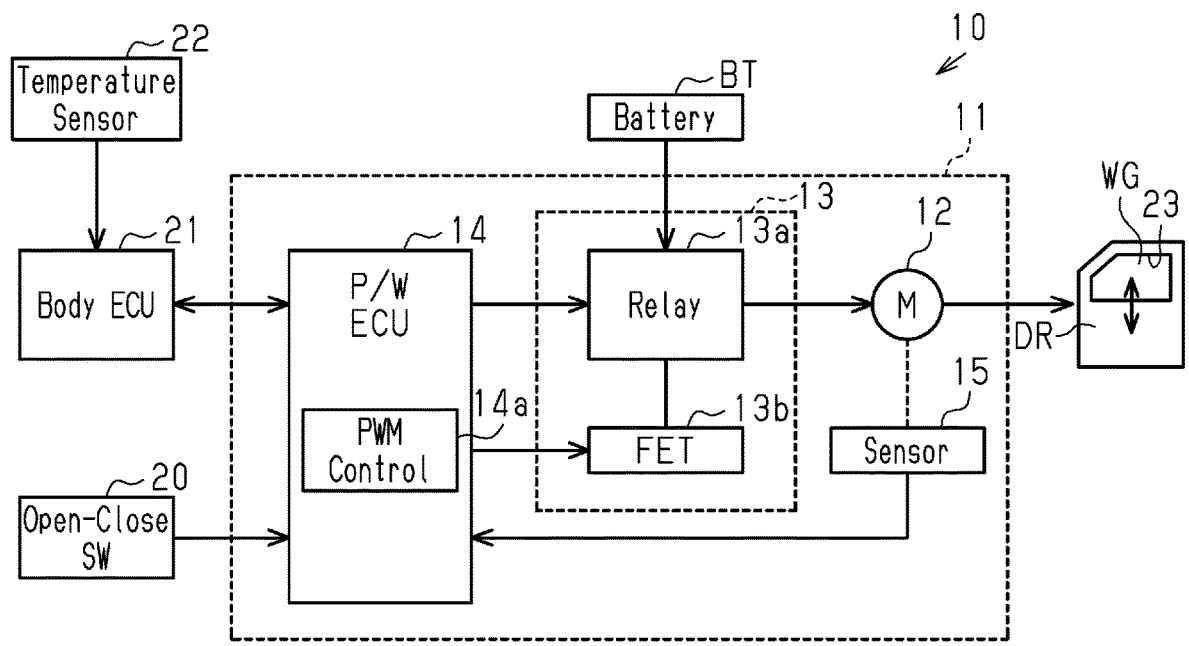
FIG. 1 is a schematic diagram of a system including an open-close body controller in accordance with one embodiment.

As shown in FIG. 1, a power window system 10 installed in a vehicle includes an open-close body controller 11 and an open-close switch 20. The open-close body controller 11 is arranged in a vehicle door DR to open and close a window glass WG of the vehicle door DR. The open-close switch 20 outputs a drive signal to the open-close body controller 11. Further, the power window system 10 includes a body electric control unit (ECU) 21 connected to the open-close body controller 11 in a manner allowing for communication.

The open-close body controller 11 is configured by a motor unit 12, a drive circuit 13, and a power window ECU (hereafter, P/W ECU) 14, which are integrated with each other. The P/W ECU 14 of the present embodiment serves as a control unit. The control unit 41 includes one or more central processing units (CPUs) or micro-processing units (MPUs). The control unit can be circuitry including: 1) one or more processors that run on a computer program (software) to execute various types of processes; 2) one or more exclusive hardware circuit such as an application specific integrated circuit (ASIC) that execute at least part of various types of processes, or 3) a combination thereof. A processor includes a CPU and a memory such as a RAM or a ROM. The memory stores program codes or commands that are configured to execute a process with the CPU. The memory, which is a computer readable medium, may be any available medium that is accessible by a versatile or dedicated computer. The control unit 41 executes various types of controls in accordance with at least one of first state information and operation information relating to an operation of an operation unit 42.

The motor unit 12 is rotated and driven in accordance with the supply of driving power from the drive circuit 13 and opens and closes the window glass WG in a vertical direction with a window regulator (not shown).

The drive circuit 13 includes a relay circuit 13*a* and a field effect transistor (FET) 13*b*. The relay circuit 13*a* is a circuit that receives the power supplied from a battery BT, which is installed in the vehicle, and starts and stops the supply of the driving power, which drives and rotates the motor unit 12 in forward and reverse directions. Further, the FET 13b is a semiconductor switching element and executes pulse width modulation (PWM) control to adjust the driving power output from the relay circuit 13a. In other words, the relay circuit 13a starts and stops driving the motor unit 12 in the forward and reverse directions. The relay circuit 13a moves and stops the window glass WG in opening and closing directions. Further, the FET 13b changes the rotation speed of the motor unit 12, that is, the moving speed of the window glass WG. The P/W ECU 14 controls the relay circuit 13a and the FET 13b.

The P/W ECU 14 includes a PWM control unit 14a. Further, the P/W ECU 14 receives a rotation pulse signal, which is synchronized with the rotation of the motor unit 12, from a rotation sensor 15. Also, the P/W ECU 14 receives an open instruction signal or a close instruction signal from the open-close switch 20, which is arranged on the vehicle door DR or the like.

When an open instruction signal is input, the P/W ECU 14 switches the relay circuit 13a to a state (ON) that supplies power, for example, in a power supply direction which rotates the motor unit 12 forward. When a close instruction signal is input, the P/W ECU 14 switches the relay circuit 13a to a state (ON) that supplies power, for example, in a power supply direction that rotates the motor unit 12 rearward. The PWM control unit 14a of the P/W ECU 14 further outputs a PWM control signal to a control terminal of the FET 13b so that the FET 13b is fixed to ON state (100% duty) or executes on-off driving at a predetermined frequency (variable duty). When the FET 13b is fixed to ON state, voltage control is not executed. When the FET 13b is on-off driven to vary the duty, voltage control is executed.

When the input of an open or close instruction signal is stopped, the P/W ECU 14 stops (OFF) supplying voltage for the motor unit 12 to the relay circuit 13a, and the PWM control unit 14a switches off the FET 13b with a PWM control signal.

The P/W ECU 14 is connected to the body ECU 21, which is a higher level ECU, via a vehicle communication system in a manner allowing for communication. The vehicle communication system includes Local Interconnect Network (LIN) communication, Controller Area Network (CAN) communication, and the like. The P/W ECU 14 obtains various types of necessary vehicle information from the body ECU 21. Further, the body ECU 21 of the present example is connected to a temperature sensor 22 that detects the outside temperature. Information of the outside temperature detected by the temperature sensor 22 is input to the P/W ECU 14 via the body ECU 21.

When the outside temperature detected by the temperature sensor 22 is a normal temperature, the P/W ECU 14 controls the voltage supplied to the motor unit 12 during a closing action to execute a normal temperature voltage control that adjusts the speed of the window glass WG. In the normal temperature voltage control, the P/W ECU 14 controls the speed of open-close actions of the window glass WG while recognizing an open-close position of the window glass WG. The P/W ECU 14 controls the speed by adjusting the driving power supplied by the window glass WG from the drive circuit 13 to the motor unit 12 (voltage supplied to motor unit 12) through PWM control executed by the FET 13b. The normal temperature voltage control is executed, for example, in a predetermined section from where a closing action is started (section A1, described later) and a predetermined section before where the window glass WG is fully closed (section A3, described later).

Actuation control (hereafter, ordinary actuation control) executed on the window glass WG by the P/W ECU 14 in correspondence with an operation of the open-close switch 20 (open or close instruction signal) when the outside temperature is a normal temperature will now be described.

Figure 3:
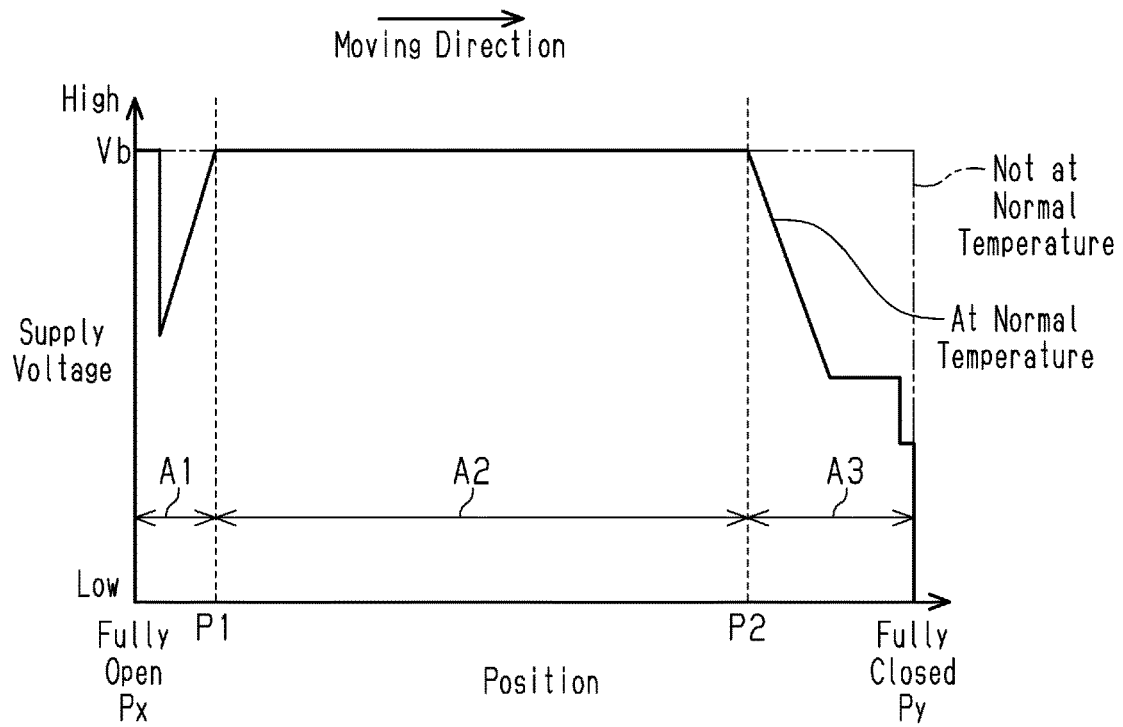
FIG. 3 is a diagram illustrating an action example of the open-close body controller in accordance with the embodiment.

When closing the window glass WG in correspondence with a close instruction signal, the P/W ECU 14 executes a slow-start control that starts moving the window glass WG at a slow speed from a fully open position Px (or, near fully open position Px) as indicated by the solid line in FIG. 3. Further, the P/W ECU 14 executes a slow-stop control that reduces the moving speed of the window glass WG near a fully closed position Py.

A first set position P1 and a second set position P2 are set at predetermined positions between the fully open position Px and the fully closed position Py of the window glass WG. Among the two set positions, the first set position P1 is closer to the fully open position Px, and the second set position P2 is closer to the fully closed position Py. Also, a section from the fully open position Px to the first set position P1 is defined as a first section A1, a section between the first set position P1 and the second set position P2 is defined as a second section A2, and a section from the second set position P2 to the fully closed position Py is defined as a third section A3. In one example, the first section A1 and the third section A3 are ranges of a window frame of the vehicle in which a glass run 23 is arranged. In one example, the first set position P1 and the second set position P2 are positions at which the window glass WG starts or ends contact with the glass run 23 during an opening or closing action.

During a closing action, in the first section A1, the P/W ECU 14 first supplies the voltage required for an initial torque (for example, 100% duty, that is, battery voltage Vb) to the motor unit 12. Then, the P/W ECU 14 controls the drive circuit 13 to lower the level of the supplied voltage. Subsequently, at the point in time when the supplied voltage is lowered to a predetermined level, the P/W ECU 14 controls the drive circuit 13 to increase the voltage supplied to the motor unit 12. In this case, the P/W ECU 14 controls the voltage supplied to the motor unit 12 to gradually increase the moving speed of the window glass WG as the present position changes (rises) while recognizing the present position of the window glass WG with a rotation pulse signal output from the rotation sensor 15. More specifically, the P/W ECU 14 controls the drive circuit 13 so that the duty ratio increases as the window glass WG rises. This gradually accelerates the window glass WG from a low-speed state as it moves the window glass WG upward toward a closed position while being gradually accelerated from a low-speed state.

In the second section A2, the P/W ECU 14 controls the drive circuit 13 so that the voltage supplied to the motor unit 12 is the battery voltage Vb. In other words, the P/W ECU 14, for example, drives the FET 13b at duty of 100% in the second section A2. This moves the window glass WG upward at a substantially constant speed.

Then, the P/W ECU 14 controls the drive circuit 13 to decrease the voltage supplied to the motor unit 12 in the third section A3. In this case, the P/W ECU 14 controls the voltage supplied to the motor unit 12 to gradually decrease the moving speed of the window glass WG as the present position changes (rises) while recognizing the present position of the window glass WG with a rotation pulse signal output from the rotation sensor 15. More specifically, the P/W ECU 14 controls the drive circuit 13 so that the duty ratio decreases as the window glass WG rises. This gradually decelerates the window glass WG from a high-speed state as it moves upward toward the closed position.

As described above, in the ordinary actuation control executed in correspondence with an operation of the open-close switch 20, the P/W ECU 14 executes the normal temperature voltage control near the fully closed position Py and the fully open position Px to execute the slow-start control and the slow-stop control.

Further, when the outside temperature detected by the temperature sensor 22 is not a normal temperature and, instead, deviated from a normal temperature, the P/W ECU 14 of the open-close body controller 11 of the present embodiment sets the voltage supplied to the motor unit 12 to be higher than that in the normal temperature voltage control. In other words, the P/W ECU 14 does not execute the normal temperature voltage control when the outside temperature detected by the temperature sensor 22 is deviated from a normal temperature. The normal temperature in the present example is a range from 0° C. or higher and lower than 40° C., although the range may be changed.

Actuation control executed on the window glass WG by the P/W ECU 14 in correspondence with a closing operation (close instruction signal) of the open-close switch 20 when the outside temperature is deviated from a normal temperature will now be described.

If the outside temperature is deviated from a normal temperature, that is, if the outside temperature is relatively high or low, when closing the window glass WG in correspondence with a close instruction signal, the P/W ECU 14 does not execute voltage control in all of the sections from the fully open position Px to the fully closed position Py as indicated by the double-dashed lines in FIG. 3. In other words, if the outside temperature is deviated from a normal temperature, that is, if the outside temperature is relatively high or low, when closing the window glass WG in correspondence with a close instruction signal, the P/W ECU 14 controls the drive circuit 13 so that the voltage supplied to the motor unit 12 is the battery voltage Vb in all of the sections from the fully open position Px to the fully closed position Py. Further, if the outside temperature is deviated from a normal temperature, that is, if the outside temperature is relatively high or low, when closing the window glass WG in correspondence with a close instruction signal, the P/W ECU 14 drives the FET 13b at the duty of 100% (i.e., fixed to ON state) in all of the sections from the fully open position Px to the fully closed position Py.

The operation of the present embodiment will now be described with reference to FIG. 2.

Figure 2:
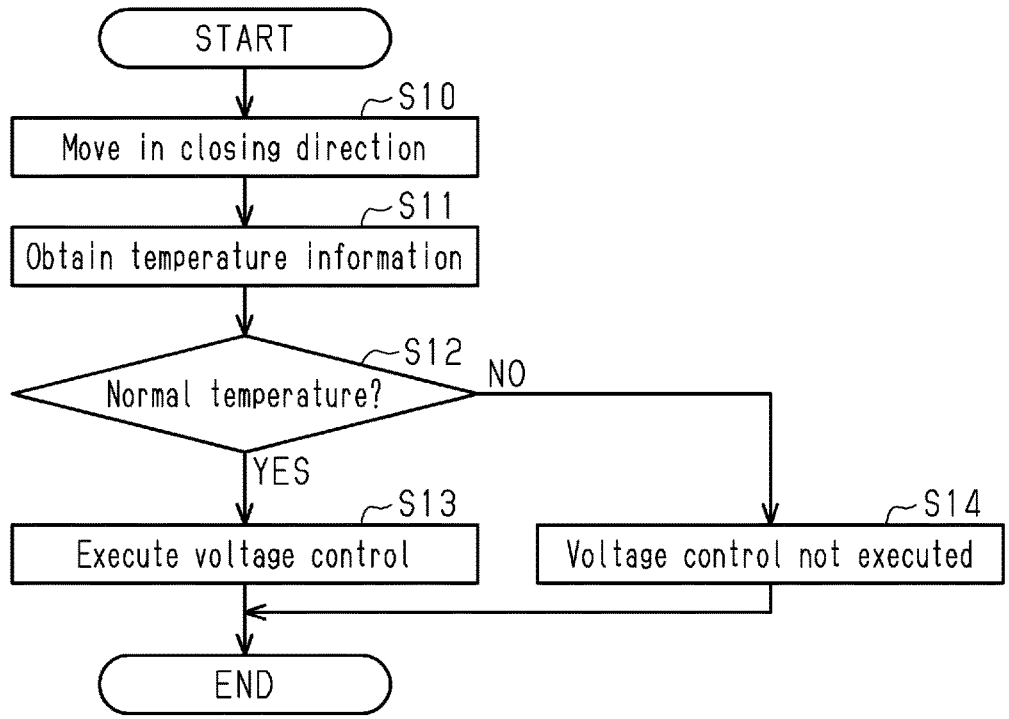
FIG. 2 is a flowchart illustrating a control example of the open-close body controller in accordance with the embodiment.

As shown in FIG. 2, in step S10, when a closing operation is performed on the open-close switch 20, the P/W ECU 14 controls the motor unit 12 via the drive circuit 13 to move the window glass WG in the closing direction (upward).

In step S11, the P/W ECU 14 obtains the information on the outside temperature detected by the temperature sensor 22 via the body ECU 21. The information on the outside temperature may be obtained once or a number of times during a closing action. Further, when the information on the outside temperature is obtained a number of times, the information may be obtained periodically or nonperiodically.

In step S12, the P/W ECU 14 determines whether the outside temperature is a normal temperature.

When the outside temperature is a normal temperature in step S12, the P/W ECU 14 executes the normal temperature voltage control in step S13 and continues the closing action.

When the outside temperature is a normal temperature in step S12, the P/W ECU 14 proceeds to subsequent step S14 and continues the closing action by supplying the battery voltage Vb, which is the externally supplied voltage, to the motor unit 12 without executing voltage control.

Subsequently, when the window glass WG is fully closed in the third section A3, the P/W ECU 14 turns OFF the FET 13b and stops the supply of voltage to the motor unit 12.

As described above, when the outside temperature is a normal temperature, the window glass WG will be fully closed even when the slow-start control and the slow-stop control are executed as the normal temperature voltage control. Further, when the outside temperature is deviated from a normal temperature, the battery voltage Vb, which is the externally supplied voltage, is supplied to the motor unit 12 without executing the normal temperature voltage control. This limits decreases in the full-closing performance and allows the window glass WG to be fully closed.

The advantages of the present embodiment will now be described.

(1) When the outside temperature is deviated from a normal temperature, higher voltage is supplied to the motor unit 12 than the normal temperature voltage control. This limits decreases in the full-closing performance under a low or high temperature.

(2) When the outside temperature is deviated from a normal temperature, the voltage supplied to the motor unit 12 is the battery voltage Vb, which is the externally supplied voltage. This eliminates the need for executing the voltage control and reduces the load on the P/W ECU 14.

The above-described embodiments may be modified as follows. The above-described embodiment and the following modifications can be combined as long as the combined modifications remain technically consistent with each other.

In the above embodiment, when the outside temperature is deviated from a normal temperature, the battery voltage Vb is supplied to the motor unit 12 in the first section A1 and the third section A3. However, this is not a limitation.

Figure 4:
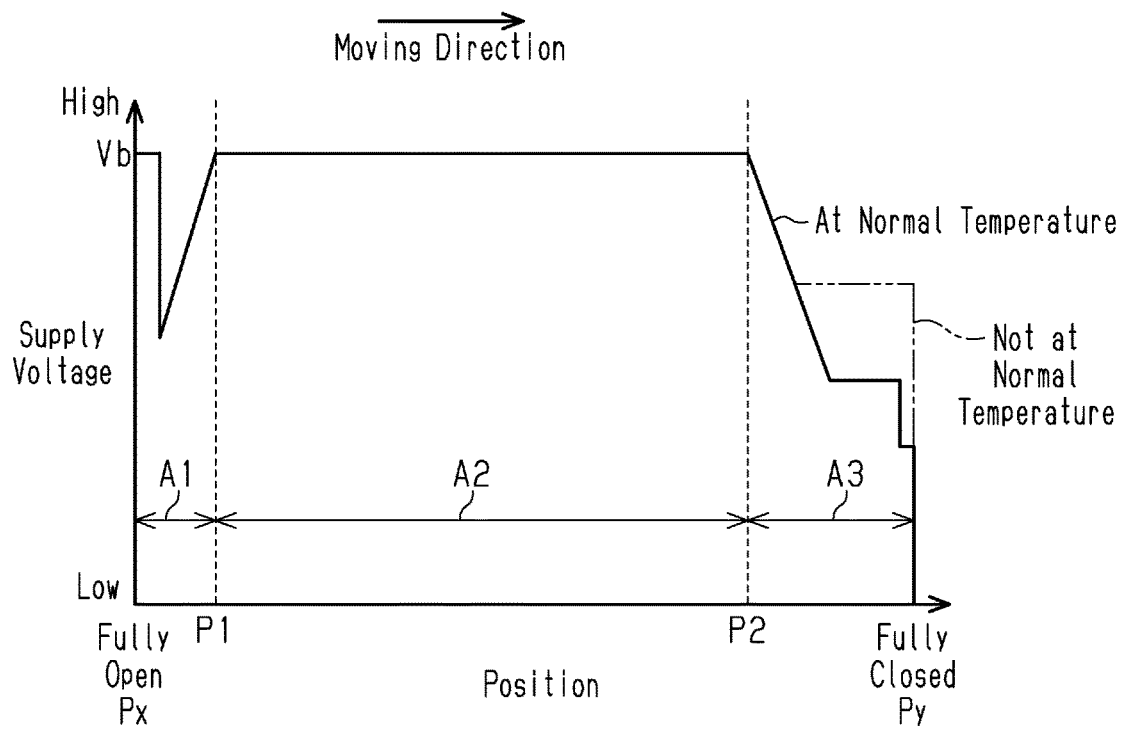
FIG. 4 is a diagram illustrating an action example of an open-close body controller in accordance with a modified example.

As shown in FIG. 4, the slow-start control may be executed in the same manner as the normal temperature voltage control in the first section A1 regardless of the outside temperature.

As shown in FIG. 4, as long as the voltage is higher than or equal to the voltage in the normal temperature voltage control in the third section, which is near the fully closed position Py, the effect of limiting decreases in the full-closing performance can be obtained.

In the above embodiment, the slow-start control and the slow-stop control are executed when the outside temperature is a normal temperature. However, for example, the slow-start control does not have to be executed.

In the above embodiment, the battery voltage Vb is supplied to the motor unit 12 in the section A2. Instead, a voltage lower than the battery voltage Vb may be supplied to the motor unit 12 in the section A2.

The drive circuit 13 is formed by the relay circuit 13a and the FET 13b. Instead, a drive circuit of a full-bridge type including four semiconductor switching elements such as FETs or a half-bridge type including two semiconductor switching elements may be used. Further, in the above embodiment, the P/W ECU 14 adjusts the voltage applied to the motor unit through the PWM control. However, such a configuration is not particularly limited.

The window glass WG includes "glass" in its name, but may be made of, for example, plastic.

Although not particularly indicated in the above embodiment, the motor unit 12 may be a brushed motor or a brushless motor.

In the above embodiment, the present invention is embodied in a vehicle power window device. Instead, the present invention may be embodied in an open-close body drive device that drives and controls an open-close body of a vehicle other than the window glass WG (such as a sunroof or a sliding door).

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An open-close body controller, comprising:
a control unit configured to:
control a motor unit to open and close an open-close body arranged on a vehicle door between a fully closed position and a fully open position;
execute a normal temperature voltage control that adjusts a speed of the open-close body by decreasing a voltage supplied to the motor unit in a predetermined section before where the open-close body is fully closed during a closing action when an outside temperature is a normal temperature; and
supply the motor unit with a higher voltage than that in the normal temperature voltage control in the predetermined section before where the open-close body is fully closed during a closing action when the outside temperature is deviated from the normal temperature.

2. The open-close body controller according to claim 1, wherein the control unit is configured to supply an externally supplied voltage to the motor unit without executing the normal temperature voltage control so that the voltage supplied to the motor unit when the outside temperature is deviated from the normal temperature is higher than that in the normal temperature voltage control.

3. The open-close body controller according to claim 1, wherein the predetermined section before where the open-close body is fully closed is a range in which a glass run is arranged on a window frame of a vehicle.

\* \* \* \* \*